US007640372B2

(12) United States Patent
Yokokura

(10) Patent No.: US 7,640,372 B2
(45) Date of Patent: Dec. 29, 2009

(54) INFORMATION PROCESSING APPARATUS, CONTROL METHOD THEREOF, PROGRAM, AND STORAGE MEDIUM

(75) Inventor: Hidenori Yokokura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 11/739,256

(22) Filed: Apr. 24, 2007

(65) Prior Publication Data

US 2007/0255863 A1 Nov. 1, 2007

(30) Foreign Application Priority Data

Apr. 28, 2006 (JP) ............................ 2006-124863

(51) Int. Cl.
*G06F 3/00* (2006.01)
*G06Q 30/00* (2006.01)

(52) U.S. Cl. .......................................... 710/15; 705/26

(58) Field of Classification Search .................. 710/15; 705/26

See application file for complete search history.

(56) References Cited

U.S. PATENT DOCUMENTS

2003/0065585 A1 * 4/2003 Satomi et al. ................ 705/26

FOREIGN PATENT DOCUMENTS

JP 2003-122533 A 4/2003

* cited by examiner

*Primary Examiner*—Henry W. H. Tsai
*Assistant Examiner*—Hyun Nam
(74) *Attorney, Agent, or Firm*—Canon USA Inc IP Division

(57) ABSTRACT

An information processing apparatus connectable to a server via a network and performing information processing. The information processing apparatus includes a managing unit configured to manage count information pertaining to the information processing, a notifying unit configured to notify the server of the count information managed by the managing unit, a receiving unit configured to receive, from a user, an instruction of deleting the count information managed by the managing unit, and a control unit configured to control the notifying unit to notify the server of the count information managed by the managing unit when the receiving unit receives the instruction.

8 Claims, 7 Drawing Sheets

| SECTION (NUMBER) | COLOR (ID = 100) | MONOCHROME (ID = 101) |
|---|---|---|
| 1234 | 20 | 158 |
| 5678 | 50 | 333 |
| 9012 | 15 | 30 |

FIG. 4

```
<env:Envelope xmlns:env="http://schemas.xmlsoap.org/soap/envelope/"
env:encodingStyle="http://schemas.xmlsoap.org/soap/encoding/">
  <env:Body>
    <ns:postSectionCount xmlns:ns="rdsgw">~41
      <client>~41-1
        <id>100</id>
        <type>type A</type>
        <appVersion>1.00</appVersion>
      </client>
      <sectionCountListType>~42
        <device>
          <mac>85:33:f2:2a</mac>
          <ip>192.168.0.1</ip>
          <serialNumber>serial:99345567</serialNumber>
          <productName>real new device..</productName>
          <type>type A</type>
        </device>
        <sectionCountType>
          <sectionID>1234</sectionID>
          <counterList>
              <id>100</id>
              <value>20</value>
              <id>101</id>
              <value>158</value>
          </counterList>
          <sectionID>5678</sectionID>
          <counterList>
              <id>100</id>
              <value>50</value>
              <id>101</id>
              <value>333</value>
          </counterList>
          <sectionID>9012</sectionID>
          <counterList>
              <id>100</id>
              <value>15</value>
              <id>101</id>
              <value>30</value>
          </counterList>
        </sectionCountType>
      </sectionCountListType>
    </ns:postSectionCount>
  </env:Body>
</env:Envelope>
```

FIG. 5

```
<env:Envelope xmlns:env="http://schemas.xmlsoap.org/soap/envelope/"
env:encodingStyle="http://schemas.xmlsoap.org/soap/encoding/">
  <env:Body>
    <ns:postDeleteSectionCount xmlns:ns="rdsgw">
      <client> 51
        <id>100</id>
        <type>type A</type>
        <appVersion>1.00</appVersion>
      </client>
      <deleteSectionCountListType>
        <device>
          <mac>85:33:f2:2a</mac>
          <ip>192.168.0.1</ip>
          <serialNumber>serial:99345567</serialNumber>
          <productName>real new device..</productName>
          <type>type A</type>
        </device>
        <deleteSectionCountType> 52
          <sectionID>5678</sectionID>
          <counterList>
              <id>100</id>
              <value>55</value>
              <id>101</id>
              <value>348</value>
          </counterList>
        </deleteSectionCountType>
      </deleteSectionCountListType>
     </ns:postDeleteSectionCount>
  </env:Body>
</env:Envelope>
```

FIG. 6

```
<SOAP-ENV:Envelope
xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns:postSectionCountResponse xmlns:ns1="rdsgw"
SOAP-ENV:encodingStyle="http://schemas.xmlsoap.org/soap/encoding/">
<return>
  <result>OK</result>
</return>
</ns:postSectionCountResponse>

</SOAP-ENV:Body>
</SOAP-ENV:Envelope>
```

FIG. 7

```
<SOAP-ENV:Envelope
xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns:postSectionCountResponse xmlns:ns1="rdsgw" SOAP-ENV:encodingStyle="
http://schemas.xmlsoap.org/soap/encoding/">
<return>
  <result>NG</result>
</return>
</ns:postSectionCountResponse>

</SOAP-ENV:Body>
</SOAP-ENV:Envelope>
```

STORAGE MEDIUM SUCH AS FD/CD-ROM

MEMORY MAP OF STORAGE MEDIUM

INFORMATION PROCESSING APPARATUS, CONTROL METHOD THEREOF, PROGRAM, AND STORAGE MEDIUM

BACKGROUND OF THE INVENTION

1. Field of the Invention

The present invention relates to an information processing apparatus for executing information processing, and more specifically, to processing of count information managed per section, for example.

2. Description of the Related Art

Recently, a system has been developed in which an information processing apparatus performing predetermined information processing transmits, to a host server, count information managed by the information processing apparatus, and the host server manages information about charging (billing) for the information processing apparatus in a centralized manner. The count information is transmitted per day or several hours via the Internet by utilizing SOAP/XML as one example of the Web technology.

The information processing apparatus used in such a system includes, e.g., a network-adapted printer or combined machine. Further, the information processing apparatus capable of managing the count information per section has the function of collecting and summing up charge information per section in an independent way. That type of system is expected to be more widely used in near future.

That type of system is disclosed in, e.g., Japanese Patent Laid-Open No. 2003-122533. Japanese Patent Laid-Open No. 2003-122533 discloses a printing system in which a printing apparatus, a charging apparatus, and a server are connected to one another via a network. In the printing system, more specifically, the printing apparatus issues a request for acquiring print data using a data identifier to identify the print data. Further, the printing apparatus receives response data, including the print data, with respect to the request, prints the print data, and notifies the result of a printing process.

On the other hand, the charging apparatus receives the request for acquiring the print data from the printing apparatus and specifies a charging target user. When the charging target user is specified, the charging apparatus transfers the request to the server. Also, upon receiving the response data including the print data from the server, the charging apparatus transfers the response data to the printing apparatus, and then updates charge information when it receives the result of the printing process from the printing apparatus. The server receives the request from the charging apparatus, specifies the print data, and sends back the response data including the print data.

However, the system of managing the charge information per section or user is often configured such that count information managed by the information processing apparatus per section or user can be deleted at the discretion of an administrator. In such a case, a problem may occur during the process of management in that, if the count information per section or user is deleted at certain timing, the final count information having been deleted for some section or user is lost when the count information should be transmitted to the server.

SUMMARY OF THE INVENTION

With the view of solving the problem described above, the present invention provides an information processing apparatus configured to notify count information held per section or user to an external device, in which when deletion of the count information managed per section or user is instructed, the relevant count information is notified to the external device and is held without being deleted until a deletion enable state is confirmed.

Also, the present invention provides a scheme capable of notifying the external device of the instruction of the deletion and the count information pertaining to the section, for which the deletion has been instructed, at proper timing.

More specifically, according to one aspect, the present invention provides an information processing apparatus connectable to a server via a network and performing information processing. The information processing apparatus includes a managing unit configured to manage count information pertaining to the information processing, a notifying unit configured to notify the server of the count information managed by the managing unit, a receiving unit configured to receive, from a user, an instruction of deleting the count information managed by the managing unit, and a control unit configured to control the notifying unit to notify the server of the count information managed by the managing unit when the receiving unit receives the instruction.

According to another aspect, the present invention provides an information processing apparatus which includes a managing unit configured to manage count information pertaining to the information processing, a display unit configured to display the count information managed by the managing unit, a receiving unit configured to receive, from a user, an instruction of deleting the count information managed by the managing unit, and a control unit configured to control the managing unit to manage the count information without deleting the count information and to control the display unit to restrict display of the count information, when the receiving unit receives the instruction.

Further features of the present invention will become apparent from the following description of exemplary embodiments with reference to the attached drawings.

BRIEF DESCRIPTION OF THE DRAWINGS

FIG. 4 shows one example of packet data transmitted to a host server from the information processing apparatus according to the exemplary embodiment of the present invention.

FIG. 5 shows another example of the packet data transmitted to the host server from the information processing apparatus according to the exemplary embodiment of the present invention.

FIG. 6 shows one example of response packet data when the transmission of a packet "postDeleteSectionCount", shown in FIG. 5, has succeeded.

FIG. 7 shows another example of the response packet data when the transmission of the packet "postDeleteSectionCount", shown in FIG. 5, has failed.

DESCRIPTION OF THE EMBODIMENTS

Exemplary embodiments of the present invention will be described below with reference to the accompanying drawing.

The accompanying drawings, which are incorporated in and constitute a part of the specification, illustrate exemplary embodiments of the invention and, together with the description, serve to explain the principle of the invention.

First Exemplary Embodiment

Figure 1:
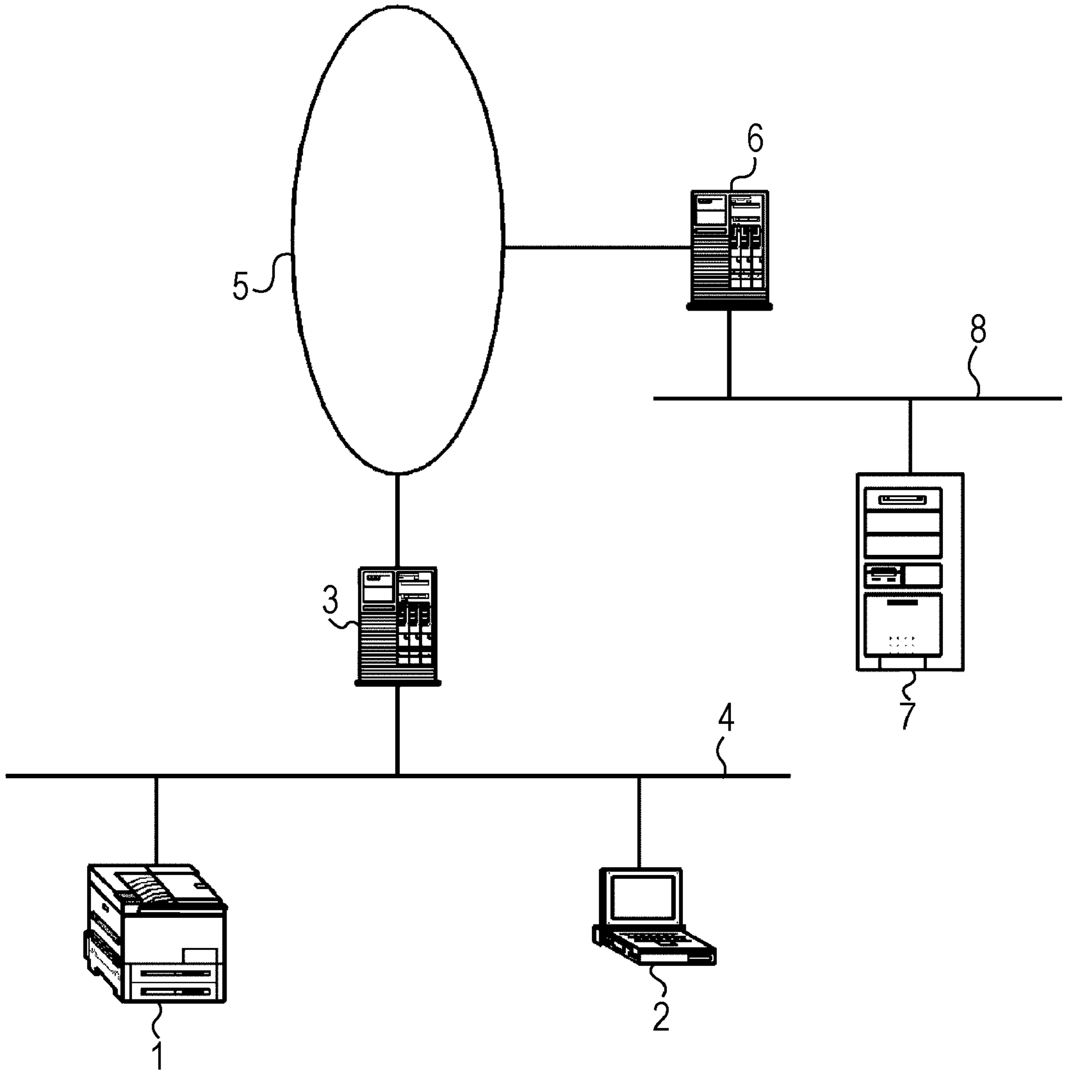
FIG. 1 is a diagram showing an overall configuration of a network system to which is applied an information processing apparatus according to an exemplary embodiment of the present invention.

FIG. 1 shows an overall configuration of a network system including an information processing apparatus according to a first exemplary embodiment of the present invention. In the network system shown in FIG. 1, a plurality of devices are connected to one another via the Internet 5 in a mutually communicable manner. In the first exemplary embodiment, a device with the function of executing a printing process is described as one example of the information processing apparatus of the present invention.

It is to be noted that the information processing apparatus of the present invention is not limited to a device with the function of executing a printing process and can be applied to any type of device so long as it executes a process of notifying an external device, which manages charge information, of count information corresponding to execution of predetermined information processing.

In other words, the information processing apparatus of the present invention can be practiced as a device performing, e.g., an inputting process, a display process, a copying process, a transmission process, and a reception process in addition to the printing process.

Referring to FIG. 1, a device 1 transmits device information, such as counter information including a count value (count information), to a (host) server 7 via the Internet 5 on the periodic or non-periodic basis. Also, the device 1 is able to execute a process of printing and outputting an input image.

The device 1 has the function of counting up the count information whenever it performs, e.g., copying or network printing. The count information is held in, e.g., a non-volatile memory within the device 1 and is notified from the device 1 to an external device. The external device notified of the count information from each device manages charge information based on the unit price set for each printing process executed.

While in the first exemplary embodiment the server 7 communicably connected to the device 1 via the network manages the charge information, another device having the function similar to that of the device 1 can also manage the charge information instead of the server 7 in a similar way performed by the server 7. Note that the device 1 is described here, by way of example, as a single-function printer, but it can be constituted as a combined machine.

In addition, the device 1 manages information representing the number of sheets printed by the printing process in correspondence to section information representing a section to which belongs a user who has instructed the execution of the printing process.

A personal computer (PC) 2 is connected to a LAN 4, i.e., an intranet, and is capable of communicating with the device 1 via the LAN 4. The PC 2 includes a control unit containing a CPU, a ROM and a RAM, and also includes an input/output device (such as a keyboard, a mouse, and a display). After loading an OS (Operating System) stored in an external storage into the RAM, the PC 2 performs various kinds of data processing by loading an application selectively designated from the user into the RAM and executing the application.

Further, the PC 2 analyzes GDI (Graphics Device Interface) from the application and sends a print job, which is generated by a printer driver, to the device 1, thus enabling network printing to be performed.

Gateway devices 3 and 6 serve as firewalls for connection to the Internet 5. The server 7 is connected to a LAN 8, i.e., an intranet.

The PC and the other devices can be connected in any suitable number other than that shown in FIG. 1.

Figures 2, 3:
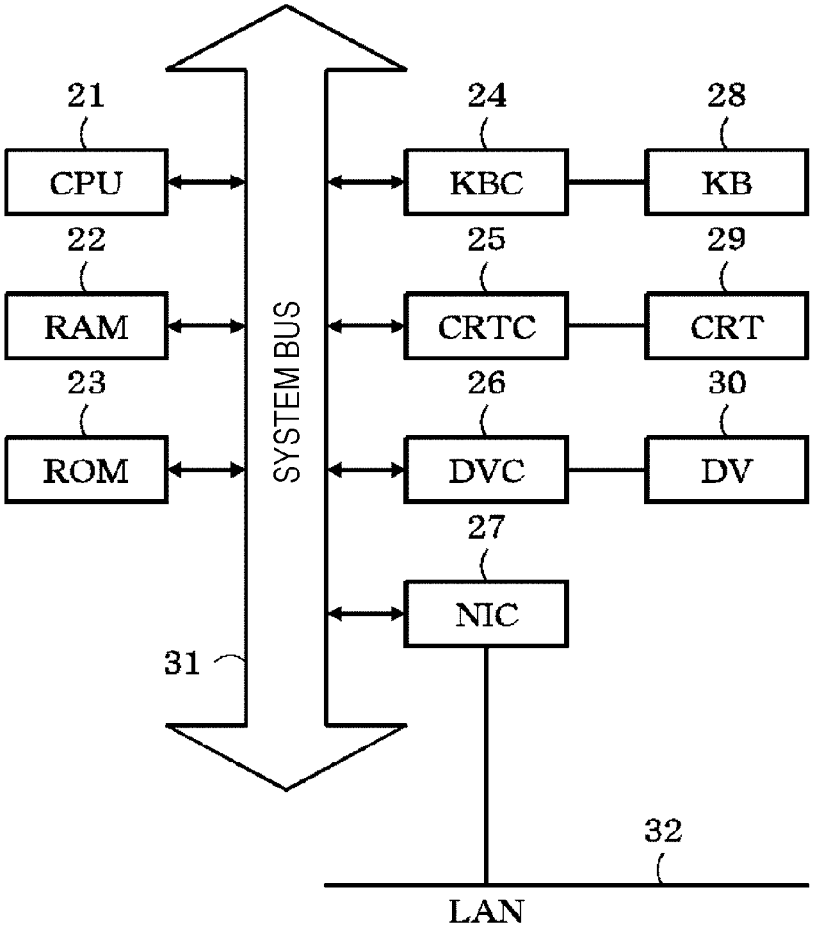
FIG. 2 is a system block diagram of the information processing apparatus according to the exemplary embodiment of the present invention.
FIG. 3 shows one example of a counter table managed in the information processing apparatus according to the exemplary embodiment of the present invention.

FIG. 2 is a system block diagram of the device 1 as shown in FIG. 1. Referring to FIG. 2, a CPU 21 executes programs stored in a ROM 23, to thereby control various devices connected to a system bus 31 in a supervising way.

The device 1 is capable of communicating with an external device, i.e., the server 7 shown in FIG. 1, through a network interface card (NIC) 27 and a LAN 32 in accordance with a predetermined protocol.

A RAM 22 serves as a main memory, a work area, etc. for the CPU 21. The RAM 22 also constitutes a backup RAM which stores the count information and the address of the server 7 to which is notified the count information. A keyboard controller (KBC) 24 controls entry of an instruction from a keyboard (KB) 28. A CRT controller (CRTC) 25 controls display of a CRT display (CRT) 29.

By using the keyboard 28 and the CRT display 29, an administrator enters an instruction of adding a new section or deleting an unnecessary section. A device controller (DVC) 26 controls a printer driver (DV) 30, etc. The network interface card (NIC) 27 enables the device 1 to bidirectionally transfer data to and from another network device or another PC via the LAN 32 in accordance with the predetermined protocol.

In the first exemplary embodiment, the LAN 32 corresponds to the LANs 4 and 8 shown in FIG. 1. Further, in the first exemplary embodiment, the count information is not limited to information managed per section and can also be given as information managed per user. The address of the server 7 and the count information can also be stored in other storage, e.g., a hard disk, than the RAM 22. In addition, the keyboard can be replaced with a virtual keyboard using, e.g., a touch panel constituted on a liquid crystal panel.

FIG. 3 shows one example of a table containing the count information managed by the device 1. The following description is made in connection with a table containing the count information managed per section.

Referring to FIG. 3, a left column contains information pertaining to a section (number) 310 which utilizes the device 1. The section number is information that is assigned, for example, as a section code by the administrator and registered in advance.

A middle column contains information pertaining to a first counter 320. In the middle column, a count value indicating the number of color prints, for example, is set per section 310. The set count value indicates the number of prints resulted from counting the number of times of actual color printings and is not always equal to the number of pages or the number of sheets printed. The reason is that, in some cases, the printing device outputs prints in layout including a plurality of pages on one sheet or performs duplex printing on both the sides of one sheet.

A right column represents information pertaining to a second counter 330. In the right column, a count value indicating the number of monochrome prints, for example, is set per section 310. The set count value indicates the number of prints resulted from counting the number of times of actual monochrome printings and is not always equal to the number of pages or the number of sheets printed.

In the first exemplary embodiment, the CPU 21 manages the first counter information 320 indicating the number of color prints and the second counter information 330 indicating the number of monochrome prints in the form of a table per section 310. Each time the device 1 performs printing, e.g., color or monochrome copying, the CPU 21 counts up a value of the corresponding counter information, thus updating the count information. While the table used in the first exemplary embodiment contains three sections, the number of sections is of course not limited to a particular value.

FIG. 4 shows one example of packet data transmitted from the device 1, shown in FIG. 1, to the server 7. It is assumed here that SOAP (Simple Object Access Protocol) on HTTP (Hyper Text Transfer Protocol) is used as the protocol. One example of the packet data transmitted from the device 1 to the server 7 is called “postSectionCount”.

Referring to FIG. 4, the illustrated data is described in the format of, e.g., XML (extensible Markup Language). A packet “postSectionCount” 41 represents a command for notifying the server 7 of the count information per section on the preset day or at the preset time. The packet “postSectionCount” 41 describes, for example, client information (tag), a section counter list (tag), and other information.

A tag <client> 41-1 includes <id> for identifying a client, <type> for identifying the type of the client, and <appversion> for identifying the version of the application.

Also, “sectionCountListType” 42 describes <device> for identifying a device and a list of <sectionCountType> indicating the counter information per section.

Further, <device> describes <mac> for identifying lower-level four bytes of the MAC (Media Access Control) address, <ip> for identifying the IP (Internet Protocol) address, the serial number <serialNumber>, the product name <produceName>, and the type <type>.

Still further, <sectionCountType> describes a section ID <sectionID> for identifying the section, and the counter information <counterList> per section.

In addition, <counterList> describes ID <id> indicating the counter type corresponding to, e.g., the color or monochrome copying, and a count value <value> per counter.

FIG. 5 shows another example of the packet data transmitted from the device 1, shown in FIG. 1, to the server 7. It is assumed here that SOAP on HTTP is used as the protocol.

The other example of the packet data transmitted from the device 1 to the server 7 using SOAP on HTTP is called “postDeleteSectionCount”. The illustrated data is described in the format of, e.g., XML.

In FIG. 5, a packet “postDeleteSectionCount” represents a command for, when the count information corresponding to a certain section is deleted in the device 1, notifying the server 7 of final count information corresponding to the section which is deleted. The packet “postDeleteSectionCount” describes, for example, client information (tag <client>) 51, a section counter list (tag <deleteSectionCountListType”) 52, and other information.

The tag <client> 51 includes <id> for identifying a client, <type> for identifying the type of the client, and <appversion> for identifying the version of the application.

Also, “deleteSectionCountListType” describes <device> for identifying a device and a list of <deleteSectionCountType> 52 indicating the counter information pertaining to the section, which is deleted.

Further, “deleteSectionCountType” 52 describes <sectionID> and the counter information <counterList> pertaining to the relevant section. In addition, <counterList> describes ID <id> indicating the counter type corresponding to, e.g., the color or monochrome copying, and a count value <value> for the relevant counter.

FIG. 6 shows one example of response packet data sent from the server 7 to the device 1 when the transmission of the packet “postDeleteSectionCount”, shown in FIG. 5, has succeeded.

As with the packet data in FIG. 4, the response packet data is also described in the format of XML and is transmitted and received using SOAP on HTTP.

Referring to FIG. 6, a response packet “postDeleteSectionCount” includes result information <return> in response to a command “postDeleteSectionCount”. The result information <return> includes a tag <result> indicating the result, which describes “OK” therein.

FIG. 7 shows one example of the response packet data sent from the server 7 to the device 1 when the transmission of the packet “postDeleteSectionCount”, shown in FIG. 5, has failed.

As with the packet data in FIG. 4, the response packet data in FIG. 7 is also described in the format of XML and is transmitted and received using SOAP on HTTP.

Referring to FIG. 7, a response packet “postDeleteSectionCount” includes result information <return> in response to a command “postDeleteSectionCount”. The result information <return> includes a tag <result> indicating the result, which describes “NG” therein.

In the first exemplary embodiment, the device 1 is constituted as one example of the information processing apparatus according to the present invention. In this example, the device 1 executes processing described below.

The device 1 includes a memory to execute the function of holing the count information per section, which is counted each time a particular process is performed. In the first exemplary embodiment, the count information is held in a non-volatile memory area (NVRAM) of the RAM 22. However, when the device 1 includes a hard disk, the count information can also be held in the hard disk.

The device 1 includes the CRT 29 to execute the function of displaying the count information per section, which is held in the NVRAM. In addition to the CRT 29, an LCD display can also be used. Another alternative example is a touch panel having a display portion and an input portion as an integral unit. In order to display the count information per section, which is held in the NVRAM, on the CRT 29, the display of the count information can be instructed, though not shown, through a tab used in the format of a tab sheet or through an operating mode display screen.

The device 1 includes the keyboard 28 to execute the function of instructing deletion of the count information that is held in the NVRAM and pertains to a particular section. When a touch panel or the like is used as described above, the instruction is issued by touching the panel.

Even when the instruction of deleting the count information pertaining to the particular section is issued with the instructing function, the CPU 21 maintains the state where the count information is held in the NVRAM, without deleting the relevant count information at once. In response to the delete instruction, however, the CPU 21 executes control to restrict display of the count information pertaining to the particular section, for which the deletion has been instructed, on the CRT 29.

Stated another way, the control is performed such that the user who has instructed the deletion recognizes as if the relevant section information and the corresponding count information are both deleted simultaneously, but the substantial content of the count information is held without being deleted.

Further, the device 1 has the function of transmitting, to an external device, i.e., the server 7 in the first exemplary embodiment, not only the event that the deletion of the particular section information has been instructed with the instructing function, but also the count information pertaining to the particular section for which the deletion has been instructed.

More specifically, the CPU 21 sends the count information, which is in the readable state held in the NVRAM and which pertains to the deletion-instructed section, to the server 7 through the NIC 27 by packet transmission in accordance with a particular protocol.

In another example, the device 1 is constituted as an information processing apparatus performing a particular process (i.e., an image forming apparatus). In this example, the device 1 executes processing described below.

The device 1 includes a memory to execute the function of holing the count information per section, which is counted each time the particular process is performed. In the first exemplary embodiment, the count information is held in a nonvolatile memory area (NVRAM) of the RAM 22. However, when the device 1 includes a hard disk, the count information can also be held in the hard disk.

The device 1 includes the keyboard 28 to execute the function of instructing deletion of the count information that is held in the NVRAM and pertains to a particular section.

Further, the device 1 has the transmitting function as follows. When the deletion is not instructed with the instructing function, the device 1 transmits the count information per section, which is held in the NVRAM, to an external device, e.g., the server 7, at particular timing. When the deletion is instructed with the instructing function, the device 1 transmits, to the external device, not only the event that the deletion of the particular section information has been instructed with the instructing function, but also the count information pertaining to the particular section for which the deletion has been instructed, at other timing than the particular timing, e.g., timing of issuance of the delete instruction.

More specifically, the CPU 21 sends the count information, which is in the readable state held in the NVRAM and which pertains to the deletion-instructed section, to the server 7 via the NIC 27 by packet transmission in accordance with a particular protocol.

The particular timing means, for example, the timing of power-on, the timing at which the number of executions of the particular process reaches a predetermined value, the timing at which particular image processing is executed, or the timing at which an error occurs in execution of image processing. Other suitable particular timing (e.g., the timing based on a notification schedule prepared by the administrator) can also be used.

In addition, the device 1 has the function of deleting the relevant count information per section, which is held in the NVRAM, when a transmission response from the server 7 is normally received after the transmission with the transmitting function.

Thus, the substantial content of the relevant count information, which has been held without being deleted after the delete instruction, is deleted at that timing. In other words, the substantial content of the count information is deleted after the device 1 has transmitted the event that the deletion of the particular section information was instructed, and it has confirmed that the server 7 normally received the final count information.

Still further, the device 1 has the function of notifying a transmission failure to a particular notification destination when the number of times of transmissions repeated with the transmitting function exceeds a predetermined value.

With that notifying function, the particular notification destination, e.g., the administrator supervising the device 1, can be positively notified of an error state in transmission of the count information. Responsively, the administrator can recognize the state of the device 1 and take a prompt and proper action on the device 1.

Figure 8:
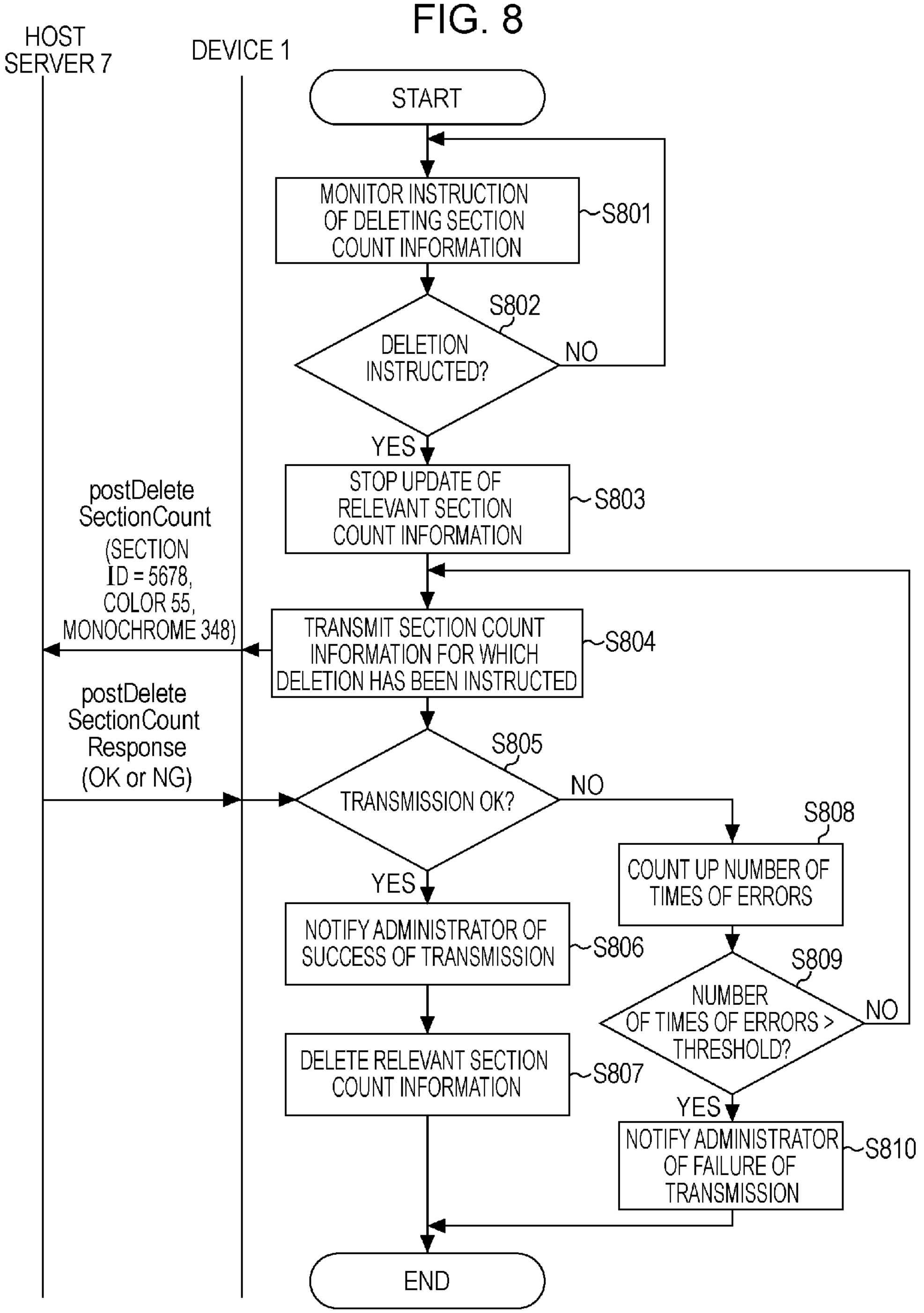
FIG. 8 is a flowchart showing one example of data processing procedures executed in the information processing apparatus according to the exemplary embodiment of the present invention.

FIG. 8 is a flowchart showing one example of data processing procedures executed in the device 1 according to the first exemplary embodiment. In this example, when deletion of the count information pertaining to a certain section is instructed, the server 7 is notified of a count value from the device 1. In FIG. 8, S801-S810 denote respective steps. Each of those steps is realized with the CPU 21, shown in FIG. 2, by loading a control program from the ROM 23 or a not-shown external storage, e.g., a hard disk, into the RAM 22 and executing the control program. The operation of the device 1 according to the first exemplary embodiment will be described below with reference to FIG. 8.

First, the processing is started from an IDLE state of the device 1. In step S801, the CPU 21 of the device 1 monitors whether an instruction of deleting the section count information is issued or not from the user or the administrator. The instruction of deleting the section count information is issued from the user through an operating unit of the device 1, or from the administrator via the network by executing a utility prepared as a management tool on a PC operated by the administrator.

Based on the monitoring in step S801, the CPU 21 determines whether the deletion of the selection count information is instructed (S802). If the determination result shows that the deletion of the selection count information is instructed, the CPU 21 proceeds to step S803.

On the other hand, if the determination result in step S802 shows that the deletion of the selection count information is not instructed, the CPU 21 returns to step S801.

In the former case, the CPU 21 immediately stops update of the relevant section count information and inhibits the use of the device 1 by users belonging to the relevant section and the associated count-up (S803). Further, the CPU 21 inhibits display of the information pertaining to the relevant section and the relevant section count information. Then, the CPU 21 transmits the count information pertaining to the section, for which the deletion has been instructed, to the server 7 via the NIC 27 shown in FIG. 2 by using "postDeleteSectionCount" in the packet shown in FIG. 5 (S804).

Thereafter, the CPU 21 receives a response to "postDeleteSectionCount", i.e., a result described in "postDeleteSectionCountResponse" shown in FIG. 6 or 7, which is transmitted from the server 7. Based on the received result, the CPU 21 determines whether the transmission has succeeded (OK) (S805).

If the determination result shows that the transmission has succeeded, the CPU 21 proceeds to step S806. If the determination result shows that the transmission has failed (NG), the CPU 21 proceeds to step S808.

In step S806, the CPU 21 notifies the administrator of the success of the transmission (S806). This notification can be performed, for example, by transmitting a message or a mail to the operating unit of the administrator, but it is not limited to a particular manner.

Then, the CPU 21 deletes all the contents of the relevant section information and the relevant section count information pertaining to the section for which the use of the device 1 is inhibited (S807). The procedures for transmitting the section count information (value), for which the deletion has been instructed, are thus brought to an end.

On the other hand, if it is determined in step S805 that the transmission has failed, the number of times of transmission errors is counted up in step S808. Then, the CPU 21 determines whether the number of times of transmission errors counted up in step S808 exceeds a threshold (e.g., 10 times) in step S809. If the determination result by the CPU 21 shows that the number of times of transmission errors exceeds the threshold, the CPU 21 proceeds to step S810. If otherwise, the CPU 21 returns to step S804.

In step S810, the CPU 21 displays the failure of the transmission of the relevant section count value, which should be transmitted in response to the instruction of deleting the relevant section count information, on a local panel (operating unit) provided in the device 1, thereby completing the procedures.

According to the first exemplary embodiment, as described above, if the deletion of the count information pertaining to the particular section is instructed in step S802 with the instructing function, the CPU 21 maintains the state where the count information per section is held in the NVRAM, without deleting the relevant section count information at once. In the example of FIG. 8, until it is determined in step S805 that the transmission has succeeded (OK), the CPU 21 does not execute step S807 of the relevant count information held in, e.g., the NVRAM of the RAM 22.

Also, if the deletion is instructed in step S802, the CPU 21 executes (though not shown) control to restrict display of the count information pertaining to the section, for which the deletion has been instructed, on the CRT 29.

Stated another way, the control is performed such that the user who has instructed the deletion recognizes as if the relevant section information and the corresponding count information are both deleted simultaneously in response to the instruction of deleting the section, but the substantial content of the count information is held without being deleted.

With that control, charge management using section counters can be properly performed by the host server 7 even under such a user environment that the section information including the count information can be optionally deleted.

While the first exemplary embodiment is described above in connection with the case where an item to be deleted is a section, the present invention can also be similarly practiced when the item to be deleted is set to a counter per user.

Further, while the first exemplary embodiment is described above in connection with the case where the section ID is itself deleted, the present invention can also be similarly practiced when a count value corresponding to the section ID or the user ID is reset (to 0) without deleting the section ID or the user ID.

While whether the transmission of the relevant section count value to be deleted has failed is determined based on the result of a response from the server, the transmission error (NG) can also be similarly determined when the response is not sent back due to a communication failure or a server failure.

The count value deleted in step S807, shown in FIG. 8, can be stored in an area originally prepared within the device or can be moved to a separate area and temporarily stored therein until it is actually deleted.

Moreover, after notifying the administrator of the transmission failure in S810 of FIG. 8, re-transmission can be stopped.

The notification to the administrator is not limited to a particular destination, i.e., a local panel, and it can be made to a remote PC on which the administrator can recognize the device state, or made by sending a mail to the administrator.

The deletion of the section counter can be made for a plurality of sections at a time, and the count values for those sections can be notified together to the server. Also, expressions used in communications between the server and the device are not limited to the above-described ones.

With the first exemplary embodiment, when deletion is instructed for any item in the count information managed by the device 1, the timing of actually starting the deletion can be set to the timing after the device 1 has received the response indicating that the host server normally received the count information for which the deletion was instructed.

Accordingly, it is possible to avoid the occurrence of a mismatched state that has been caused in the past due to a communication error or other reasons between the count information pertaining to the device monitored by the host server and the count information held in the device when the deletion of the counter including the count information is instructed. As a result, when the deletion of the counter is instructed at any timing, the host server on the network can receive the normal count information from the device and can be prevented from executing a false charging process.

In the first exemplary embodiment described above, when a delete button indicating a counter for a particular section is pushed on a UI displayed on an operating unit (not shown) of the device 1, the section count information pertaining to the particular section (ID) is transmitted to the host server at once. Simultaneously, the host server is notified of the event that the deletion of the particular section (counter) has been instructed.

At that time, the relevant section count information is deleted from the UI, but it is continuously held in the device as the count data, though it is not counted up, until transmission of the count information pertaining to the deleted section to the host server is completed. When the transmission to the host server is successfully completed, the relevant section count information is deleted from the count data in the device with insurance of safety.

Further, if an error is caused in the transmission to the host server, the user is notified of that the relevant section count information cannot be deleted. In such a case, the transmission to the host server can be repeated, and if successful completion of the transmission is performed, it can be notified to the user.

Second Exemplary Embodiment

The configuration of a data processing program readable by the information processing apparatus according to the present invention will be described below with reference to a memory map shown in FIG. 9.

Figure 9:
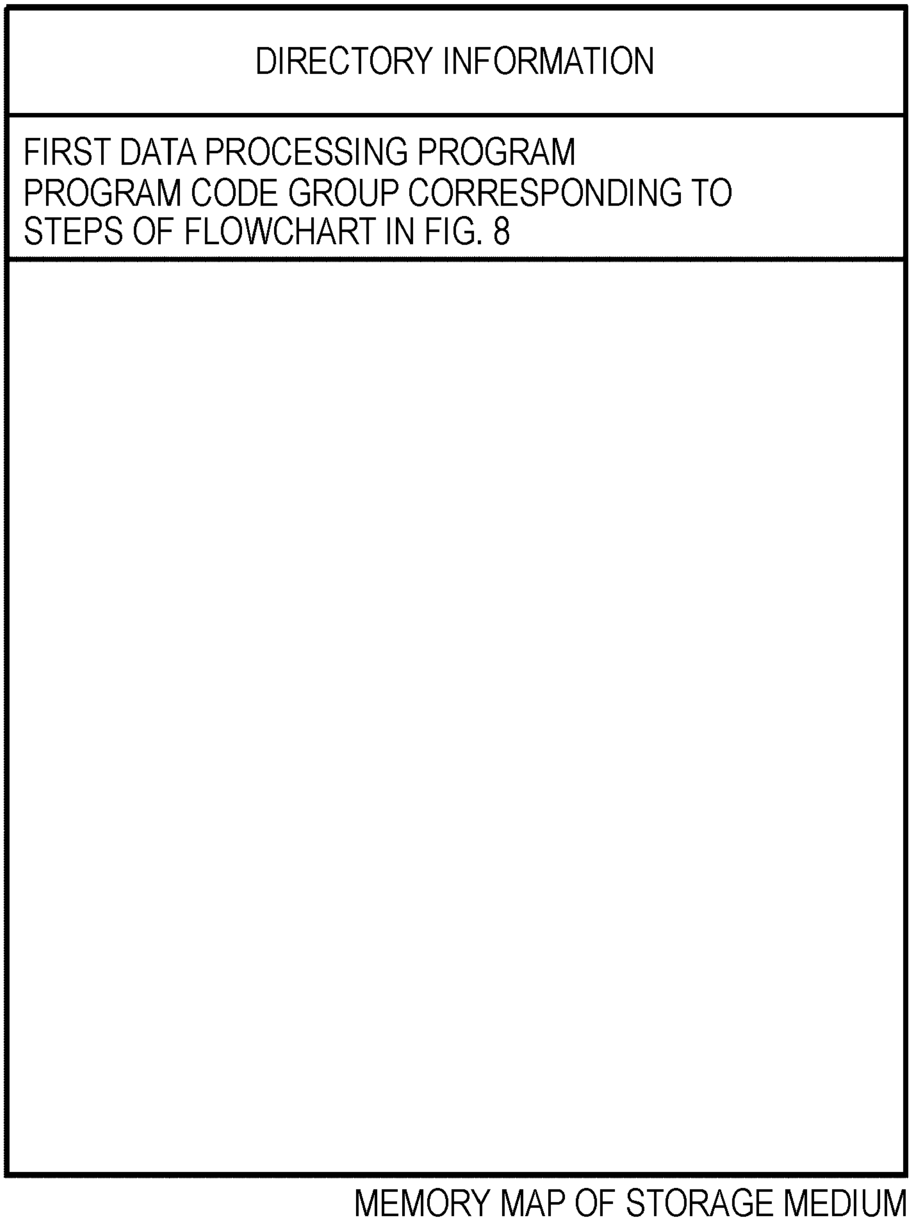
FIG. 9 is a table for explaining a memory map in a storage medium which stores various data processing programs readable by the information processing apparatus according to the exemplary embodiment of the present invention.

FIG. 9 is a table for explaining a memory map in a storage medium which stores various data processing programs readable by the information processing apparatus according to the exemplary embodiment of the present invention.

In some cases, though not shown, the memory map further includes not only information for managing a group of programs stored in the storage medium, such as version information and the writer's name, but also information depending on, e.g., the OS in the side reading the programs, such as icons for indicating the programs in an identifiable manner.

Data belonging to various programs are also managed in the same directory. In some cases, there are further stored, e.g., a program for installing the various programs into a computer, and a decompressing program when the installed program is compressed.

The functions of the exemplary embodiment of the present invention, shown in FIG. 8, can also be executed by a host computer using an externally installed program. In this respect, the present invention involves the case where an information group containing programs is supplied to an output device from a storage medium, e.g., a CD-ROM, a flash memory or a FD, or an external storage medium via a network.

The functions of the present invention can also be achieved by supplying a storage medium, which stores program code of software for realizing the functions of the above-described exemplary embodiment, to a system or an apparatus. In this case, a computer (CPU or MPU) in the system or the apparatus reads and executes the program code stored in the storage medium.

In the above case, the program code read out of the storage medium serves to realize the novel functions of the present invention. Hence the storage medium storing the program code constitutes an implement for practicing the present invention.

The program may have any of various forms, e.g., object code, a program executed by an interpreter, and script data supplied to the OS, so long as the program has the required functions.

Recording media for providing the program can be, e.g., a flexible disk, a hard disk, and an optical disk, a magneto-optical disk (MO), CD-ROM, CD-R, CD-RW, a magnetic tape, a nonvolatile memory card, ROM, DVD, etc.

In that case, the program code read out of the storage medium serves to realize the functions of the above-described exemplary embodiment. Hence the storage medium storing the program code constitutes an implement for practicing the present invention.

Further, the program can be supplied through the steps of connecting a client computer to a homepage on the Internet by using a browser in the client computer, and downloading the computer program according to the present invention in itself or a file, which contains the computer program in compressed form and which has the automatic installing function, to a recording medium, e.g., a hard disk, from the connected homepage. As another method, program code constituting the program according to the present invention can be divided into a plurality of files, and those files can be downloaded from different homepages. In other words, the present invention involves a WWW server or a FTP server for downloading, to a plurality of users, a program file which realizes the functions and the processing required in the present invention with a computer.

Alternatively, the program can also be supplied as follows. The program according to the present invention is encrypted and stored in a storage medium, e.g., CD-ROM, for distribution to users. The user who clears predetermined conditions is allowed to download key information necessary for decryption from a homepage. The user decrypts and executes the encrypted program by using the downloaded key information, thus installing the program in the computer.

The functions of the above-described exemplary embodiment are realized with the computer executing the read program code. Moreover, the present invention of course involves the case where the functions of the above-described exemplary embodiment are realized in such a manner that, for example, an OS operating on the computer executes a part or the whole of actual processing in accordance with instructions from the read program code.

In addition, the present invention of course involves the case where the functions of the above-described exemplary embodiment are realized as follows. The program code read from a storage medium is written in a function expansion board inserted in a computer or a memory incorporated in a function expansion unit connected to the computer. Then, a CPU or the like incorporated in the function expansion board or the function expansion unit executes a part or the whole of actual processing in accordance with instructions from the read program code.

The present invention is not limited to the above-described exemplary embodiments and can be modified in various forms (including organic combinations of the exemplary embodiments) based on the purport of the present invention. Those modifications should not be excluded from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-124863 filed Apr. 28, 2006, which is hereby incorporated by reference herein in its entirety.

What is claimed is:

1. An information processing apparatus connectable to a server via a network, the information processing apparatus comprising:

a managing unit configured to manage count information pertaining to the information processing;

a notifying unit configured to notify the server of the managed count information managed by the managing unit;

a receiving unit configured to receive, from a user, an instruction of deleting the managed count information;

a control unit configured to control the notifying unit to notify the server of the managed count information, and to inhibit use of the information processing apparatus by the user relating to the managed count information that is instructed to be deleted when the receiving unit receives the instruction;

a determination unit configured to determine whether the notification by the notifying unit has succeeded or failed; and a deleting unit configured to delete the managed count information in a case where it is determined that the notification by the notifying unit has succeeded, wherein the managed count information is not deleted in a case where it is determined that the notification by the notifying unit has failed.

2. The information processing apparatus according to claim 1, wherein the managed count information indicates a number of images formed in image forming process, the managed count information being associated with section information indicating a section to which belongs a user who instructed execution of the image forming process.

3. The information processing apparatus according to claim 2, wherein the instruction is an instruction of resetting the information of the number of images formed.

4. The information processing apparatus according to claim 2, wherein the instruction is an instruction of deleting the section information.

5. The information processing apparatus according to claim 1, wherein the control unit controls the notifying unit to notify the server of the count information again when the determining unit determines that the notification by the notifying unit has failed.

6. The information processing apparatus according to claim 1, wherein the control unit executes control to notify a predetermined user of a failure of the notification by the notifying unit when the determining unit determines that the notification by the notifying unit has failed more than a predetermined number of times.

7. A control method for an information processing apparatus connectable to a server via a network and performing information processing, the method comprising:

managing count information pertaining to the information processing;

notifying the server of the managed count information;

receiving, from a user, an instruction of deleting the managed count information;

executing control to notify the server of the managed count information, and to inhibit use of the information processing apparatus by the user relating to the managed count information that is instructed to be deleted, when the instruction is received;

determining whether the notification has succeeded or failed; and deleting the managed count information in a case where it is determined that the notification has succeeded, wherein the managed count information is not deleted in a case where it is determined that the notification has failed.

8. A computer readable medium containing computer-executable instructions for controlling an information processing apparatus connectable to a server via a network and performing information processing, the medium comprising:

managing count information pertaining to the information processing;

notifying the server of the managed count information;

receiving, from a user, an instruction of deleting the managed count information;

executing control to notify the server of the managed count information, and to inhibit use of the information processing apparatus by the user relating to the managed count information that is instructed to be deleted, when the instruction is received;

determining whether the notification has succeeded or failed; and deleting the managed count information in a case where it is determined that the notification has succeeded, wherein the managed count information is not deleted in a case where it is determined that the notification has failed.

* * * * *